United States Patent [19]

Schindl

[11] 3,935,011

[45] Jan. 27, 1976

[54] SYSTEM FOR MAKING COMPOSITE PHOTOMICROGRAPHS

[75] Inventor: Klaus P. Schindl, Wion, Austria

[73] Assignee: C. Reichert Optische Werke AG, Vienna, Austria

[22] Filed: Apr. 18, 1973

[21] Appl. No.: 351,913

[52] U.S. Cl. ............... 96/41; 96/44; 354/120; 350/19
[51] Int. Cl.² ............... G03C 5/04; G03C 5/06
[58] Field of Search ........ 96/44, 41, 42, 43; 354/79, 354/125, 122, 120; 350/19, 54; 352/46

[56] References Cited
UNITED STATES PATENTS

| | | | |
|---|---|---|---|
| 1,543,065 | 6/1925 | Douglass | 354/125 |
| 1,827,924 | 10/1931 | Williams | 352/46 |
| 2,420,339 | 5/1947 | Rabinow | 354/125 |
| 2,460,163 | 1/1949 | Bowen | 354/125 |
| 2,806,415 | 9/1957 | Friedberg | 354/125 |
| 2,910,913 | 11/1959 | Michel | 350/19 |
| 2,931,723 | 4/1960 | Clark | 352/46 |
| 3,088,390 | 5/1963 | Zimmerman | 354/125 |
| 3,551,019 | 12/1970 | Michel | 350/19 |
| 3,590,712 | 7/1971 | Ataka | 354/125 |

*Primary Examiner*—Edward C. Kimlin
*Attorney, Agent, or Firm*—Alan H. Spencer; William C. Nealon; H. R. Berkenstock, Jr.

[57] ABSTRACT

By using two or more masks in a microscope having an optical system with an intermediate image plane therein in combination with a camera, composite photomicrographs can be prepared with two or more images.

1 Claim, 5 Drawing Figures

SYSTEM FOR MAKING COMPOSITE PHOTOMICROGRAPHS

BACKGROUND OF THE INVENTION

Composite photomicrographs have normally been prepared by optically combining separate images or skilled photographic dark room techniques with two or more negatives. Another system for preparing photomicrographs has recently developed, using a "half frame" camera. As the name implies, this camera permits two separate exposures to be made in a single frame, with each exposure on a respective half of the frame.

The prior art systems are either complex and expensive or lack versatility, or require true creativity in refined dark room techniques.

BRIEF DESCRIPTION OF THE INVENTION

The present invention avoids the disadvantages of the prior art by permitting two or more masks to be sequentially placed in a single location during sequential exposures of a single film frame to provide composite photomicrographs. The composite photomicrographs may record two or more magnifications, or the same object, as viewed during different microscopy techniques, i.e., interference contrast and phase contrast or bright field and dark field.

It is one object of the present invention to provide a means of preparing comparison photomicrographs.

It is another object of the present invention to provide a photomicrographic system having improved versatility.

It is a further object of the present invention to provide a photomicrographic system enabling comparison photomicrographs to be prepared by plural exposures of a single frame.

These and other objects will be more fully explained by the following description.

Briefly, the present invention is directed to a photomicrographic system comprising a microscope with an optical system having an intermediate image plane in combination with a conventional camera for use with a microscope. By placing a succession of suitable masks at the intermediate image plane, one skilled in the art can prepare a single photomicrograph by successive exposures with the masks, respectively. The system of the present invention is extremely versatile because the mask borders are not restricted to straight lines or specific areas. The system of the present invention is of advantage because it is not restricted to photomicrographs having only two comparative areas.

DETAILED DESCRIPTION OF THE PRESENT INVENTION

Figure 1:
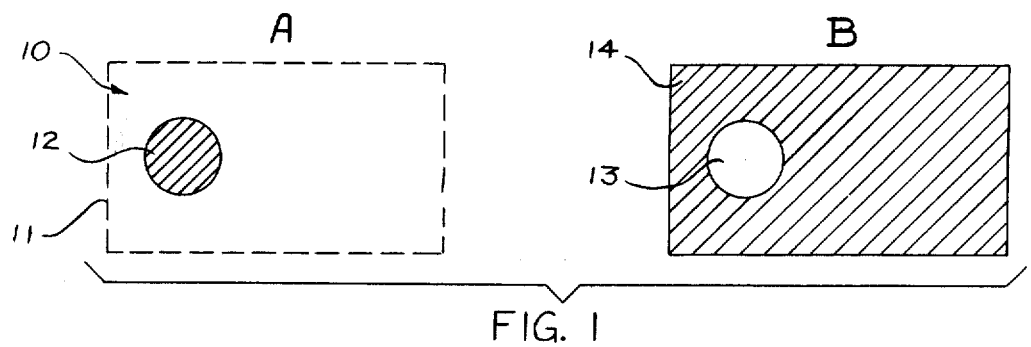
FIG. 1 is a pair of complementary masks.

Referring to FIG. 1, 10 indicates the transparent portion of mask A having a real or imaginary border 11. Border 11 is adapted to correspond to the size and shape of the camera field. The border may be marked on the transparent portion in order to assist the observer in positioning the object for photographing. The border 11 may also be a real border of the transparent portion of the mask. For example, the transparent portion of the mask may be held by a metal frame such as will be described later, blocking out that portion of the microscope field which does not correspond to the camera field. In this form, the size and shape of the opening in the metal holder will define border 11. Ocluded 12 occludes all light from a corresponding portion of the film upon exposure with mask 10. Complementary mask B has a transparent portion 13 defining an area precisely located to correspond with the opaque portion 12. The remaining portion of mask B is opaque to occlude all light permitted to pass during exposure with mask A.

Figure 2:
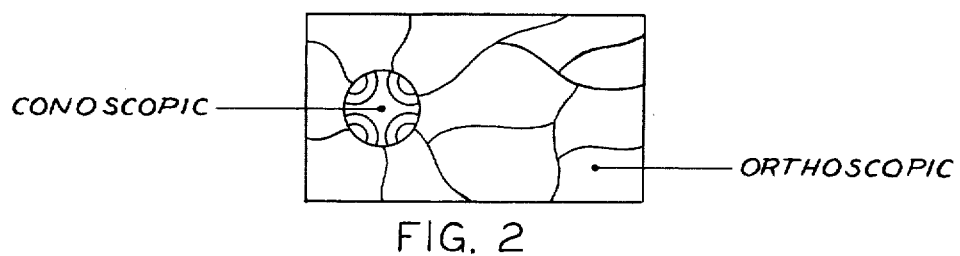
FIG. 2 is a representative photomicrograph prepared sequentially utilizing a pair of masks of the type illustrated in FIG. 1.

FIG. 2 is representative of a photograph having an orthoscopic image in the area corresponding to the image transmitted through area 10 of mask A, and a conoscopic image in the area corresponding to the image transmitted through portion 13 of mask B.

Figure 3:
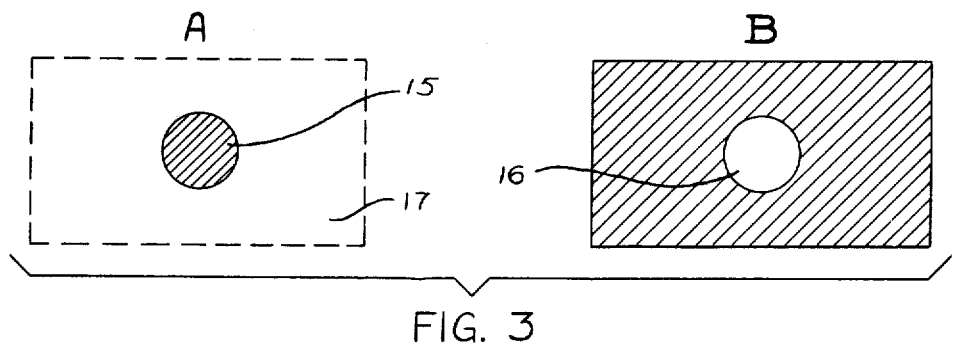
FIG. 3 is a pair of complementary masks.

FIG. 3 represents another embodiment of a complementary pair of masks similar to those of FIG. 1, having the opaque area 15 of mask A and transparent portion 16 in mask B located in the center of the camera field.

Figure 4:
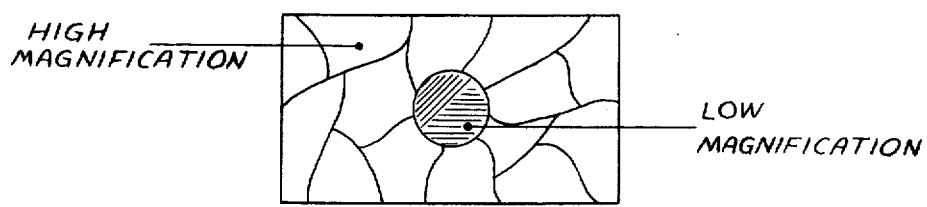
FIG. 4 is a representative photomicrograph prepared sequentially utilizing a pair of masks of the type illustrated in FIG. 3.

FIG. 4 is representative of a photograph having a low magnification portion in the area corresponding to the transparent portion 16 and a high magnification portion corresponding to the transparent area 17.

Figure 5:
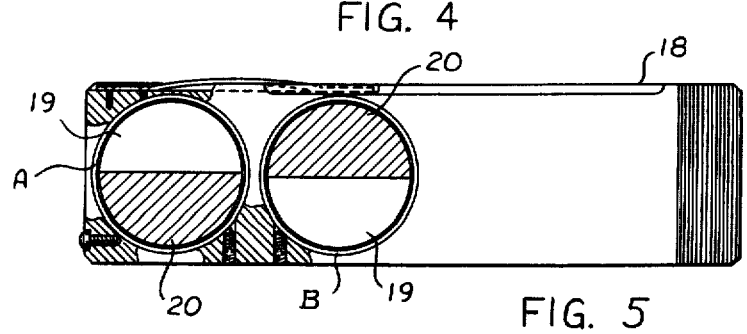
FIG. 5 illustrates a complementary pair of masks in a holder.

FIG. 5 illustrates a mask holder 18 with a complementary pair of masks mounted therein. The masks shown generally at A and B are full field masks, as opposed to the camera field masks of FIGS. 1 and 3. Each mask has transparent portion 19 and opaque portion 20 complementarily arranged in order that the A mask may be used for a first exposure to obtain a photographic image corresponding to that imaged at the intermediate image plane in the area defined by 19 in mask A. The holder 18 is then repositioned to align mask B coincident with the light path through the microscope at the intermediate image plane. A second exposure permits a photographic image on the same film frame corresponding to that imaged in the area 19 in mask B.

Microscope systems having intermediate image planes are known. One example is shown in co-pending application Ser. No. 201,390 filed Nov. 23, 1971, now abandoned, which is owned by the assignee of the present application. Referring to FIG. 3 of the co-pending application and the text associated therewith, both of which are incorporated herein by reference, intermediate image plane 21 is shown in the microscope relay system. A mask holder of the type illustrated in FIG. 5 of the present application is suitable for use in such a microscope which is adapted to accept reticles and the like located at the intermediate image plane. While the drawings only exemplify masks dividing the field into two portions, the invention includes as well, three or more complementary masks which divide the field into three or more respective segments, i.e., thirds, quarters, etc.

The foregoing description of embodiments of Applicant's invention is given by way of illustration and not of limitation. The concept and scope of the invention is limited only by the following claims and equivalents thereof which may occur to others skilled in the art.

What is claimed is:

1. A method of preparing composite photomicrographs comprising the steps of:

positioning a mask in the intermediate image plane of a microscope, said mask having a transparent portion and an opaque portion and said mask being optically aligned with the optical path of said microscope;

making a first exposure on a frame of a camera film plane through said microscope intermediate image plane;

positioning a second mask in said intermediate image plane, said second mask having a transparent portion corresponding to the opaque portion of said first mask and an opaque portion corresponding to the transparent portion of said first mask and being located in optical, alignment on the optical path of said microscope; and making a second exposure of the said frame, whereby a composite photograph of a single object is produced.

* * * * *